(No Model.)
D. O. BRUNNER.
BROODER.
No. 525,255. Patented Aug. 28, 1894.
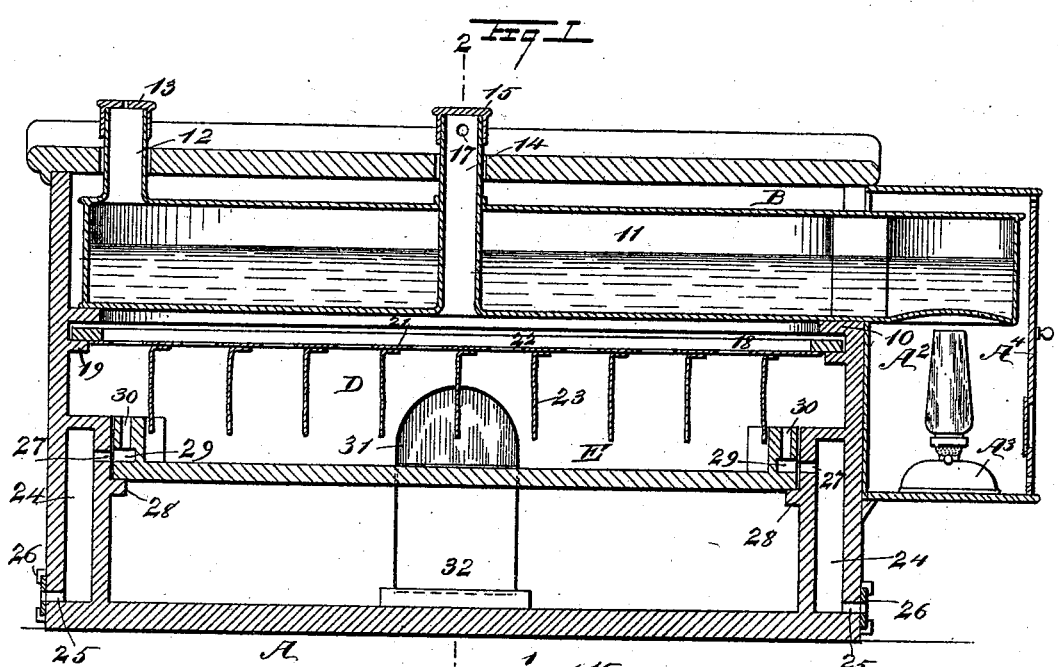
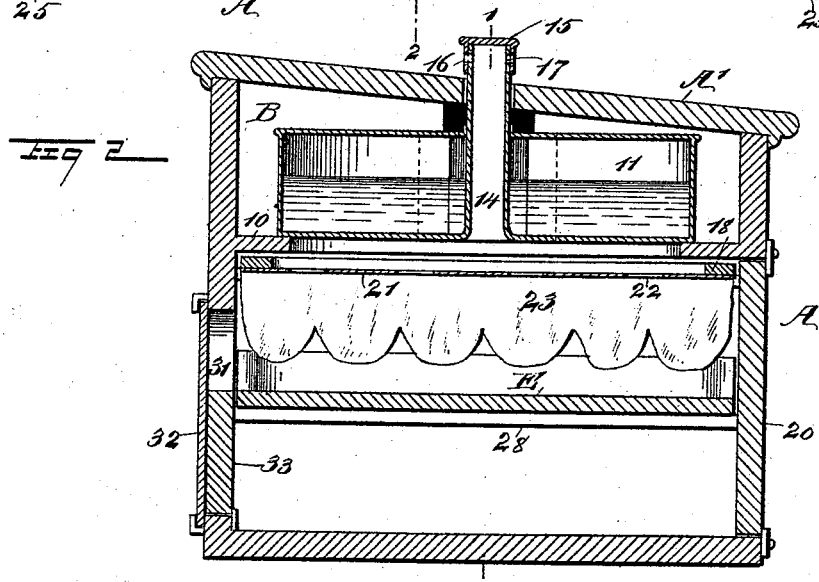
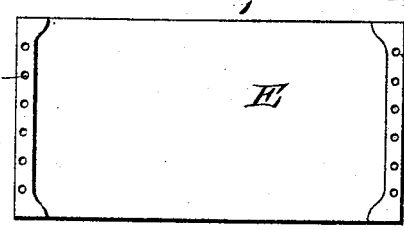
WITNESSES:
H. Walker
C. Sedgwick
INVENTOR
D. O. Brunner
BY
Munn & Co
ATTORNEYS.

UNITED STATES PATENT OFFICE.

DANTON O. BRUNNER, OF SOMERSET, OHIO.

BROODER.

SPECIFICATION forming part of Letters Patent No. 525,255, dated August 28, 1894.

Application filed November 10, 1893. Serial No. 490,537. (No model.)

*To all whom it may concern:*

Be it known that I, DANTON O. BRUNNER, of Somerset, in the county of Perry and State of Ohio, have invented a new and Improved Brooder, of which the following is a full, clear, and exact description.

My invention relates to a brooder, and it has for its object to provide a suitable device for protecting young chickens, or other fowls, without the aid of their natural mother, until they are large enough to take care of themselves.

A further object of the invention is to so construct the brooder that it will combine warmth, dryness and ventilation, and be capable of being readily and expeditiously cleansed when occasion may demand.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a longitudinal vertical section through the brooder, the section being taken practically on the line 1—1 of Fig. 2. Fig. 2 is a transverse vertical section through the brooder, said section being taken essentially on the line 2—2 of Fig. 1; and Fig. 3 is a plan view of the chick floor, removed.

The body A of the brooder may be of any desired shape. In the drawings it is shown as substantially rectangular, being of greater length than width, and it is provided with an inclined roof A'. In the top portion of the body a heating chamber B, is located, extending from end to end, and the said heating chamber is entirely open at the bottom with the exception of a horizontal flange 10, which extends at right angles from the inner face of the body. A heating pan 11, is made to rest upon this flange, the said heating pan being in tank form, and it is adapted to contain water. The pan is made to project through one end of the body into an annex A², and the said annex contains a lamp A³, or other heating device, through the means of which the water in the tank is kept at a suitable temperature. The annex is provided with a door A⁴, in order to afford ready access to the lamp.

Near one end of the tank a tubular extension 12, is formed, and the said tubular extension is provided with an apertured cap 13, located above the roof A', and through the extension 12 the steam will find its escape. At or near the center of the tank, a second tubular extension 14, is provided, which extends from the bottom of the tank up through the top and out beyond the roof A' of the body, whereby the air from the interior of the body below the chamber B may find an exit; and the rapidity of the exit of the air, as well as the quantity, are regulated by locating preferably upon the upper end of the air-escape tube 14 a cap 15, and the said cap is provided with apertures 16, which may be brought in registry with corresponding apertures 17 made in the tube, as shown in both Figs. 1 and 2.

The mother D, consists of a frame 18, which extends from side to side and from end to end of the body immediately below the under surface of the heating tank 11. The frame is supported in slide-ways 19, and may be withdrawn from one side or from one end of the body, preferably from one side, which is provided with a door 20, as shown in Fig. 2, capable of being readily removed and of practically exposing the entire length of the interior of the body. In addition to the frame 18 the mother consists of a horizontal partition 21, which is secured to the frame 18 preferably at the bottom thereof, and the said partition is usually made of a fabric, as for example canton flannel, and is provided with series of openings 22, so that ample heat may find its way into the main or chick chamber of the brooder, yet the chicks will not be subjected to the direct radiation of the heat.

The openings 22, are arranged in rows, and between each row of openings a curtain 23, is located, the lower edge of which curtains is broken or scalloped, as shown in Fig. 2, in order that the chicks may snug up to the curtains and to each other in like manner as they would under a natural mother, and be contented and warm.

The chicks, when they are very young, are placed upon what I denominate a chick floor E, and the said floor is located immediately below the curtains of the mother, sustaining such relation to the mother that the chicks may readily snug up to the curtains.

At each end of the body the wall is made double, forming thereby a chamber 24. The end chambers 24, are adapted for ventilating purposes, and are made to terminate below the support 19 of the mother frame. The chambers 24, receive air from the exterior of the brooder through openings 25 made in the ends thereof at the bottom, and the amount of air entering the ventilating chambers 24 may be controlled by suitable slides 26, located upon the ends of the brooder.

The air escapes into the chick chamber of the brooder from the upper portion of the ventilating chambers 24 through series of openings or apertures 27, made near the top of the chambers in the inner walls of the same. Immediately below the outlet openings 27 in the ventilating chambers, slide-ways 28, are formed upon the inner walls of said chambers, adapted to receive and support the chick floor E. At each end of the chick floor an air chamber 29, is formed, extending practically from side to side, and the said air chamber is in communication with the openings 27 in the air chambers 24 of the body, while the air escapes from the chamber 29 of the chick floor through openings 30 leading from said chamber out through the upper end portions of the chick floor. Thus it will be observed that while an ample amount of air is supplied to the chick chamber and to the chicks on the chick floor, there will be no harmful draft, as the air enters the chick chamber at a point removed from the chicks.

An opening 31 is made in the side of the brooder opposite that closed by the door 20; and the opening 31 is normally closed by a slide 32, or its equivalent, as shown in Fig. 2. The opening 31 being on a level with the chick floor it is used to introduce the chicks to the floor, but the opening may be made to extend down to the bottom of the brooder by removing a block 33, as shown in Fig. 2, since when the chicks become large it is necessary to place the chick floor upon the bottom of the brooder; but even when the chick floor is in the bottom of the brooder the air will enter the chick chamber at a point some distance above the chicks.

It is evident that the device is exceedingly simple, durable and economic, and as heretofore stated, it combines warmth, dryness and ventilation, and both the mother and the chick floor may be expeditiously and conveniently removed and cleansed; in fact, access may be had to any portion of the brooder for cleaning or for other purposes.

Having thus described my invention, I claim as new and desire to secure by Letters Patent—

1. In a brooder the combination with an inclosure having air chambers communicating with the outside atmosphere, of a heating apparatus located in the upper part of the inclosure a chick chamber located below the heating apparatus, a floor for said chamber, an air chamber formed at each end of the chick floor and extending substantially from side to side of said floor, the said air chambers communicating with the air chambers of the inclosure and provided with openings communicating with the interior of the chick chamber, substantially as shown and described.

2. In a brooder, the combination, with an inclosure having air chambers formed therein at opposite sides, communicating with the outside atmosphere, and a heating device located in the upper portion of the inclosure, the said heating device being uncovered at its bottom, of a mother located beneath the heating device, consisting of a movable frame, a perforated partition carried by the frame, and curtains projected downward from the partition, a removable chick floor supported within the inclosure below the curtains, said chick floor being provided with an air chamber at opposite ends in communication with the air chambers of the inclosure, and likewise in communication with the interior of the inclosure in the vicinity of the mother, substantially as and for the purpose set forth.

3. In a brooder, the combination, with an inclosure having air chambers formed therein at opposite sides, communicating with the outside atmosphere, and a heating device located in the upper portion of the inclosure, the said heating device being uncovered at its bottom, of a mother located beneath the heating device, consisting of a movable frame, a perforated partition carried by the frame, and curtains projecting downward from the partition, said curtains being of fabric and provided with scalloped lower edges, a removable chick floor supported within the inclosure below the curtains, said chick floor being provided with an air chamber at opposite ends in communication with the air chambers of the inclosure, and likewise in communication with the interior of the inclosure in the vicinity of the mother, as set forth.

4. In a brooder, the combination with an inclosure, having air chambers communicating with the outside atmosphere, of a heating device located in the upper portion of said inclosure, a chick chamber located immediately below the heating device and having a horizontal apertured fabric partition, at the upper part thereof, curtains extending downward from the partition, and a chick floor supported below the curtains, the said chick floor being provided with air chambers at opposite ends communicating with the air chambers of the inclosure and also communicating with the interior of the chick chamber, and a tube for the exit of air from the interior of the inclosure, the said tube extending from the bottom of the heating device through the roof of the inclosure, as and for the purpose set forth.

DANTON O. BRUNNER.

Witnesses:
O. B. REAM,
W. H. PARKS.